(12) United States Patent
Jensen

(10) Patent No.: US 7,335,152 B2
(45) Date of Patent: Feb. 26, 2008

(54) WEB FORMING MACHINE

(76) Inventor: L. Gary Jensen, N. 818 Ormond Ct., Liberty Lake, WA (US) 99019

( * ) Notice: Subject to any disclaimer, the term of this patent is extended or adjusted under 35 U.S.C. 154(b) by 114 days.

(21) Appl. No.: 11/244,722

(22) Filed: Oct. 6, 2005

(65) Prior Publication Data

US 2006/0027066 A1 Feb. 9, 2006

Related U.S. Application Data

(63) Continuation of application No. 10/798,103, filed on Mar. 10, 2004, now abandoned.

(51) Int. Cl.
B26D 5/02 (2006.01)

(52) U.S. Cl. ............... 493/473; 493/402; 493/468; 493/471; 83/36; 83/552; 83/553; 83/751; 83/469; 29/465

(58) Field of Classification Search ......... 493/468, 493/365, 471, 473, 402, 454; 83/552, 549, 83/551, 34, 36, 199, 750, 751, 469, 553; 29/465
See application file for complete search history.

(56) References Cited

U.S. PATENT DOCUMENTS

| | | | |
|---|---|---|---|
| 3,066,542 A | 12/1962 | Einhiple | |
| 3,174,378 A | 3/1965 | Friedland et al. | |
| 3,205,744 A | 9/1965 | Huck | |
| 3,239,912 A | 3/1966 | Baumgartner et al. | |
| 3,557,599 A | 1/1971 | Eickenhorst | |
| 3,581,535 A | 6/1971 | Hinks et al. | |
| 3,643,537 A | 2/1972 | Fries | |
| 3,673,835 A | 7/1972 | Arfert | |
| 3,696,655 A | 10/1972 | Hinks et al. | |
| 3,850,780 A | 11/1974 | Crawford et al. | |
| 4,052,873 A | 10/1977 | Murzin et al. | |
| 4,273,015 A | 6/1981 | Johnson | |
| 4,285,259 A | 8/1981 | Jelinek et al. | |
| 4,602,541 A | 7/1986 | Benzinger et al. | |
| 4,658,688 A * | 4/1987 | Shah et al. | 83/552 |
| 4,732,028 A | 3/1988 | Bodnar | |
| 5,040,397 A | 8/1991 | Bodnar | |
| 5,386,620 A | 2/1995 | Hinterlechner et al. | |
| 5,561,998 A | 10/1996 | Bodnar | |
| 5,595,560 A | 1/1997 | Kamada | |
| 5,913,760 A * | 6/1999 | Kamada et al. | 483/1 |
| 5,913,761 A * | 6/1999 | Kamada et al. | 483/29 |
| 5,983,693 A | 11/1999 | Bodnar | |
| 6,071,222 A * | 6/2000 | Schneider | 493/355 |
| 6,205,898 B1 | 3/2001 | Surina | |
| 6,725,751 B1 * | 4/2004 | Surina | 83/49 |

\* cited by examiner

Primary Examiner—Christopher Harmon
(74) Attorney, Agent, or Firm—Wesley B Ames

(57) ABSTRACT

A web forming machine, and a method of forming a web is described and which includes a first rotatable assembly; a second rotatable assembly positioned in spaced relation relative to the first rotatable assembly, and wherein a gap is defined between the first rotatable assembly, and the second rotatable assembly; and wherein a web of material to be formed is received in the gap; and means for reciprocally moving the first rotatable assembly into contact with the web, and into mating relation relative to the second rotatable assembly.

5 Claims, 8 Drawing Sheets

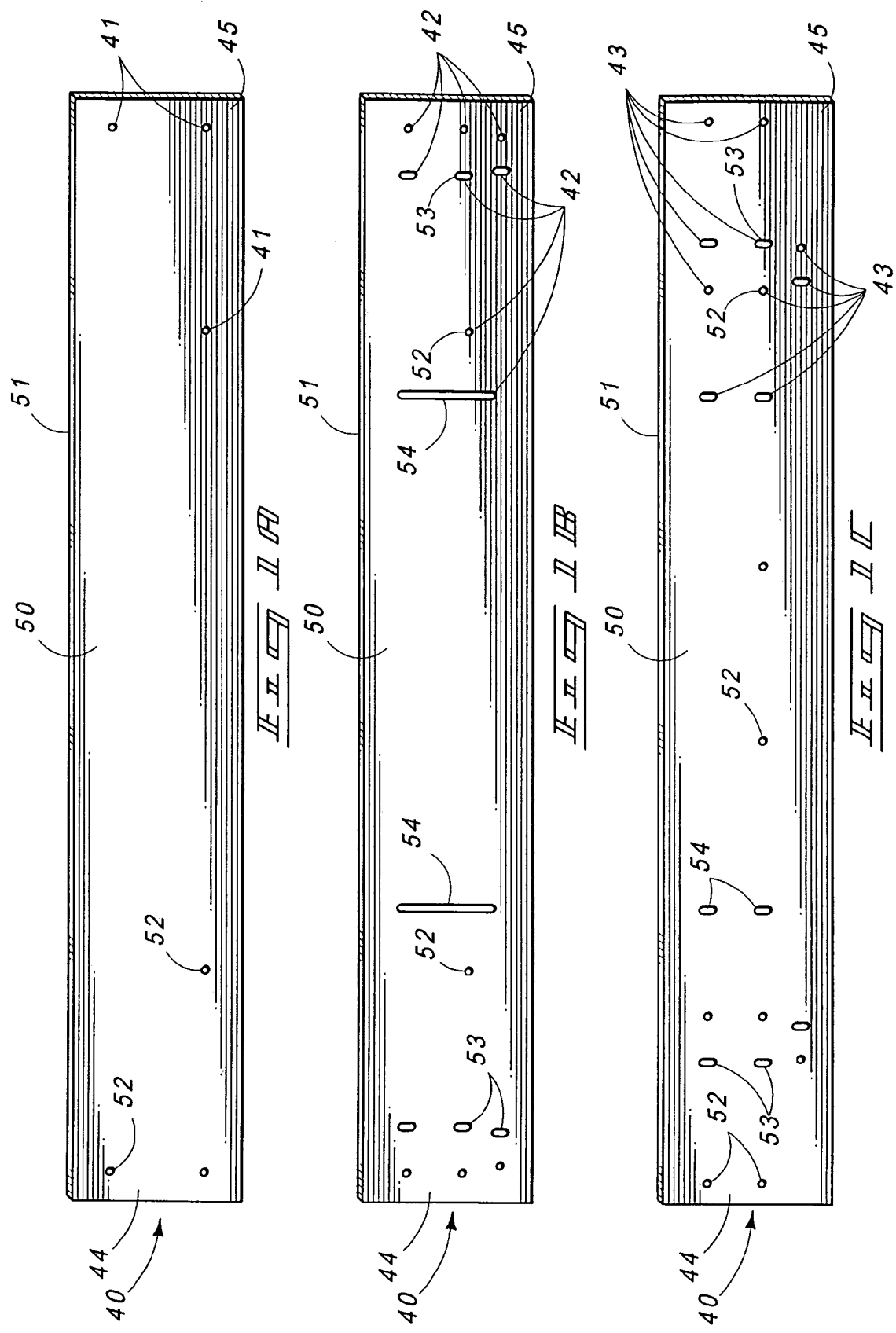

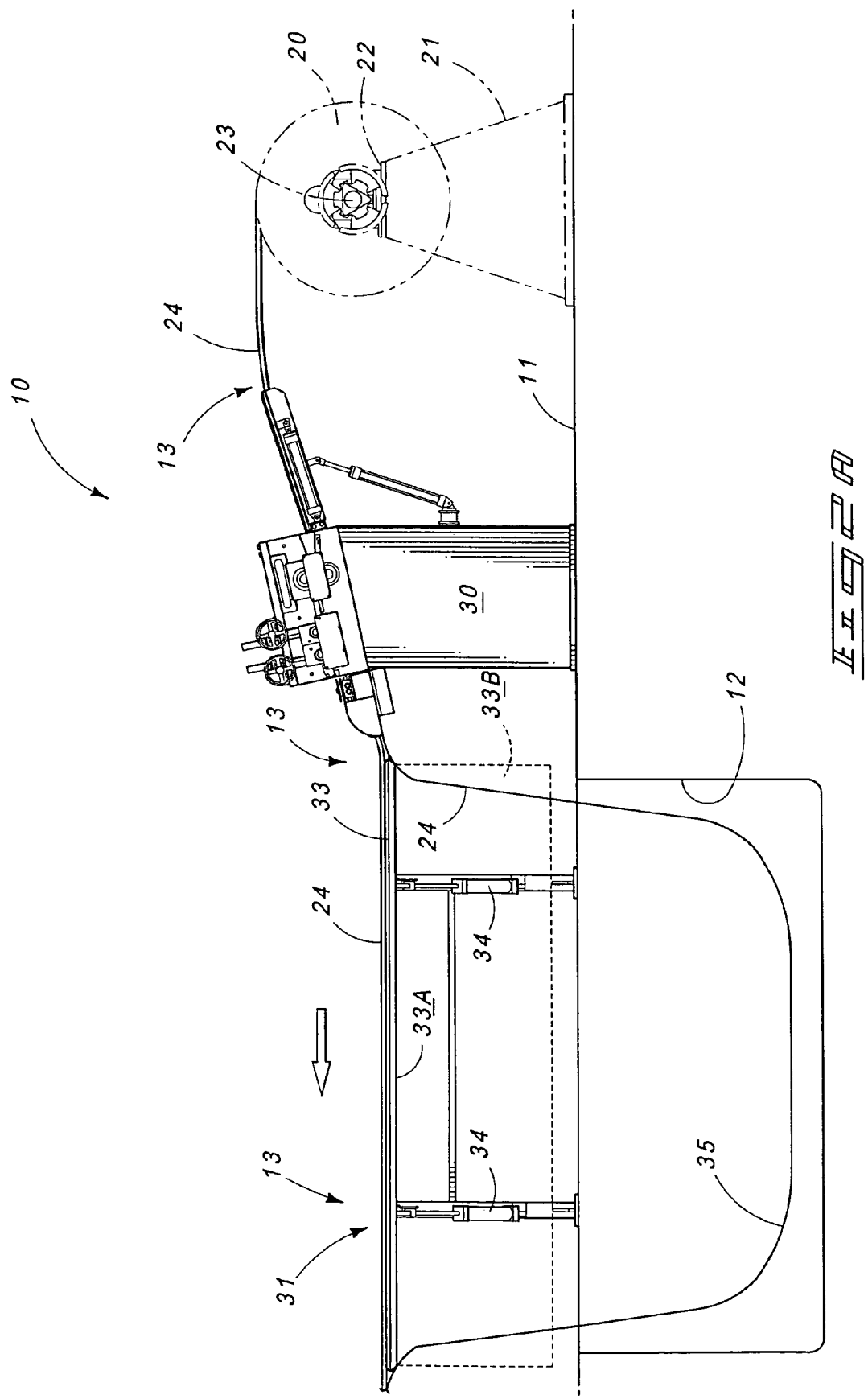

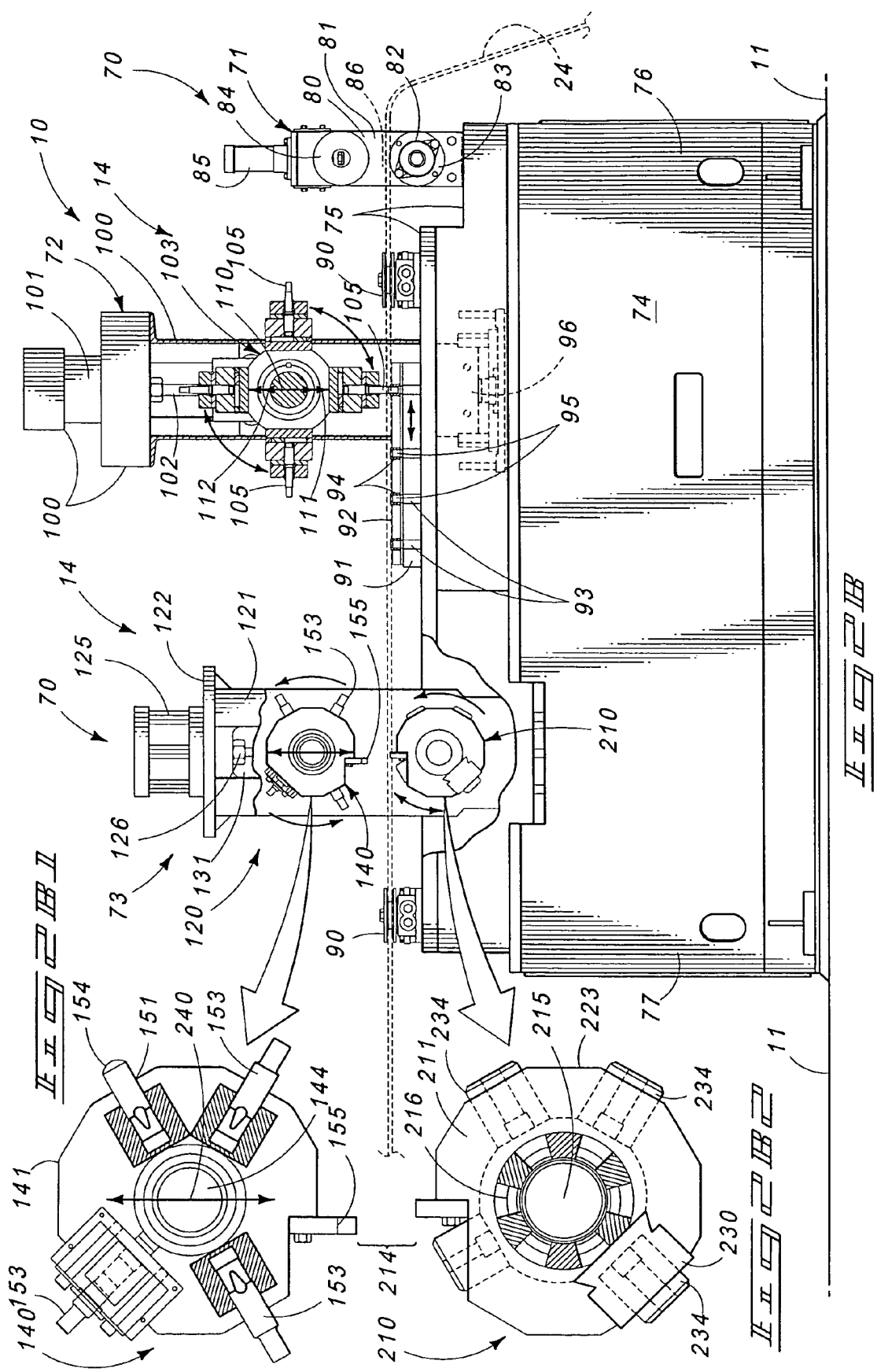

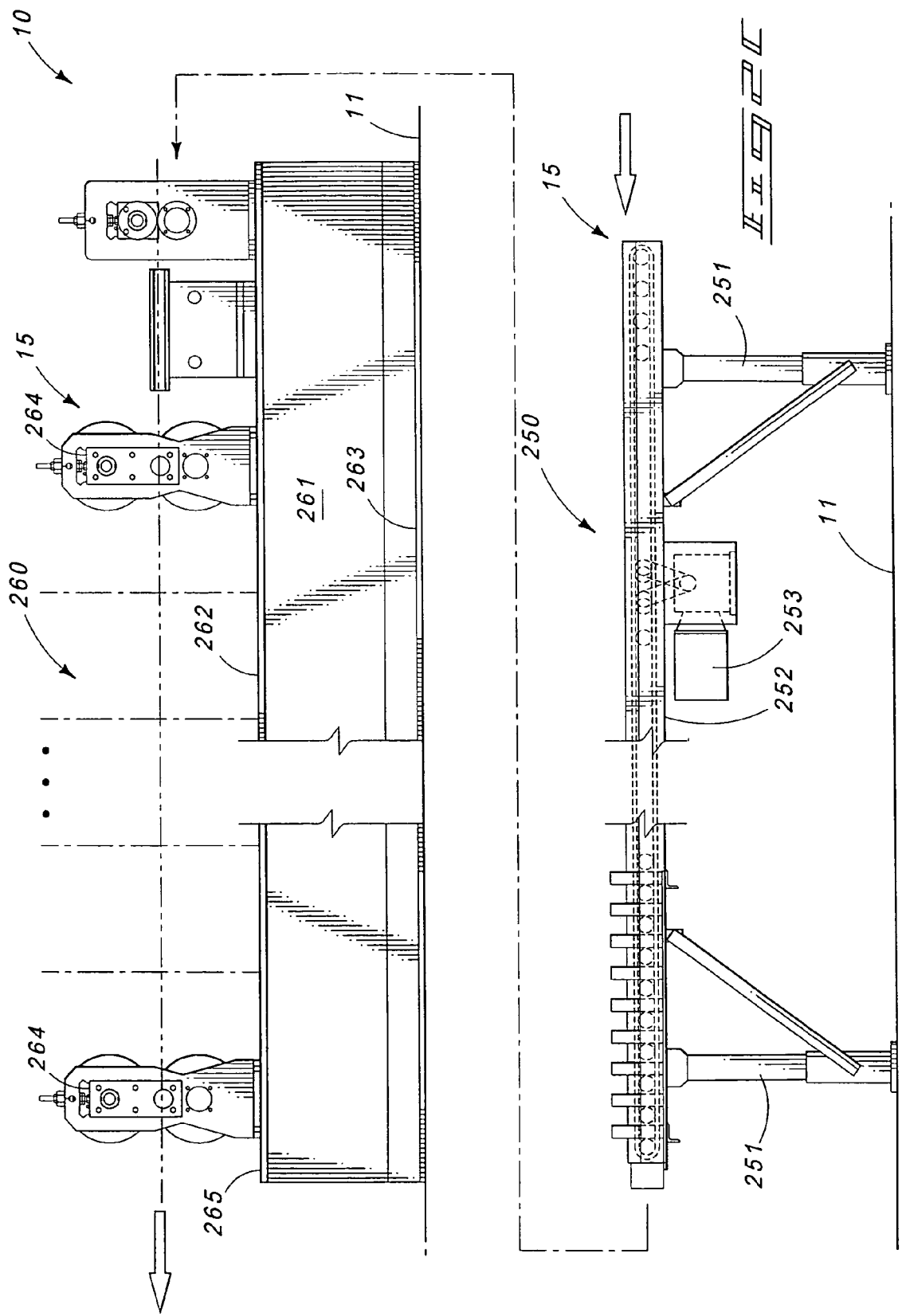

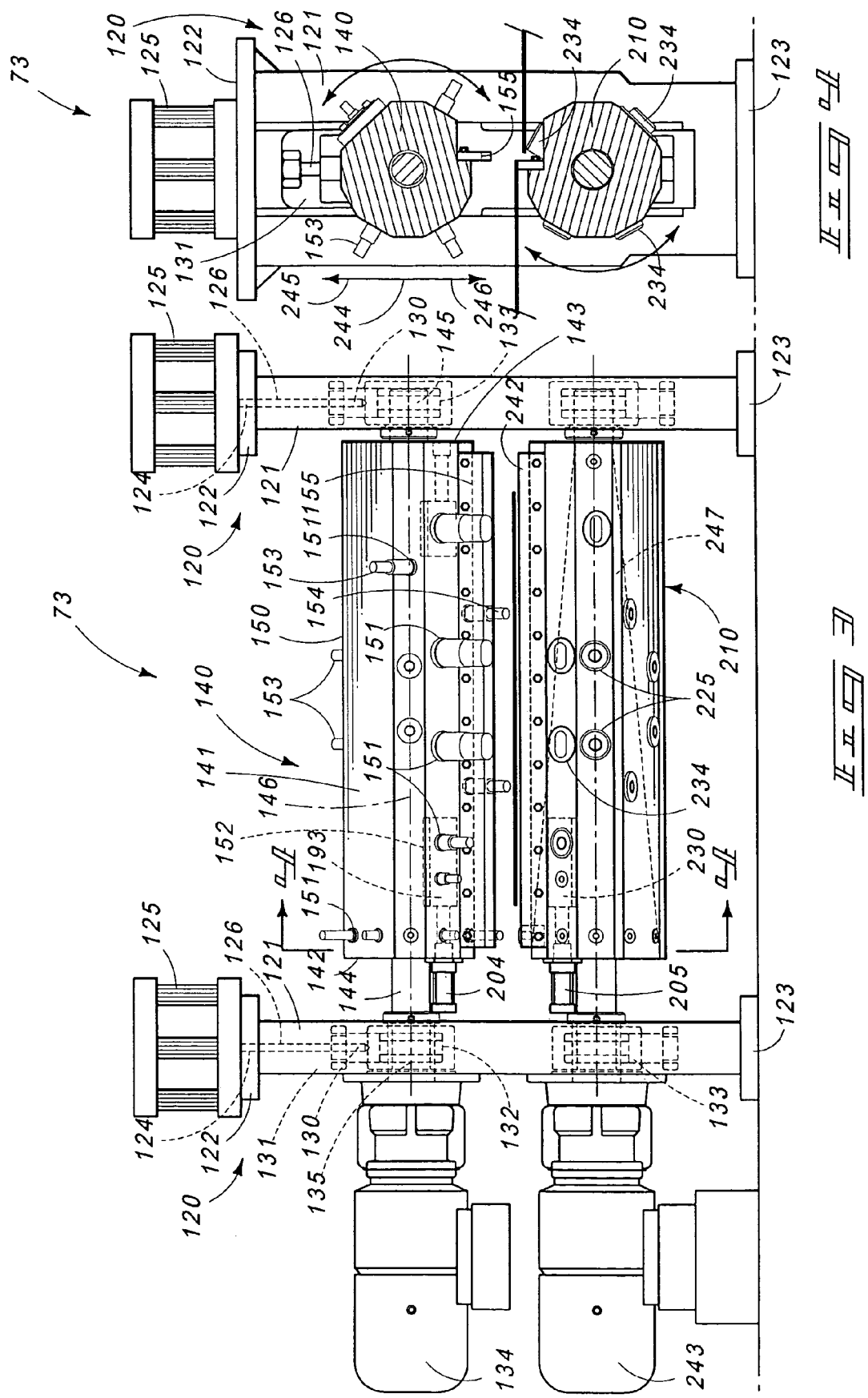

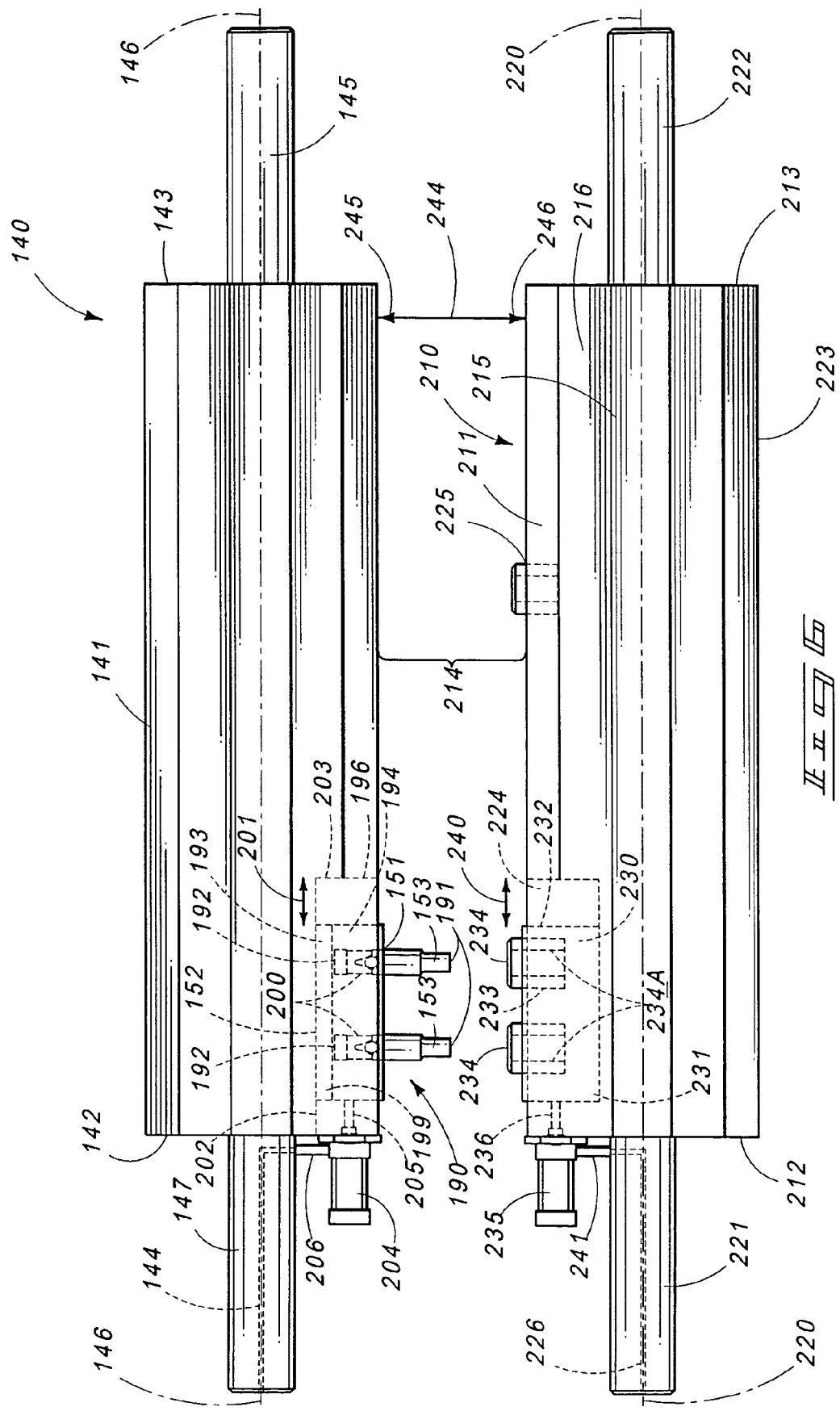

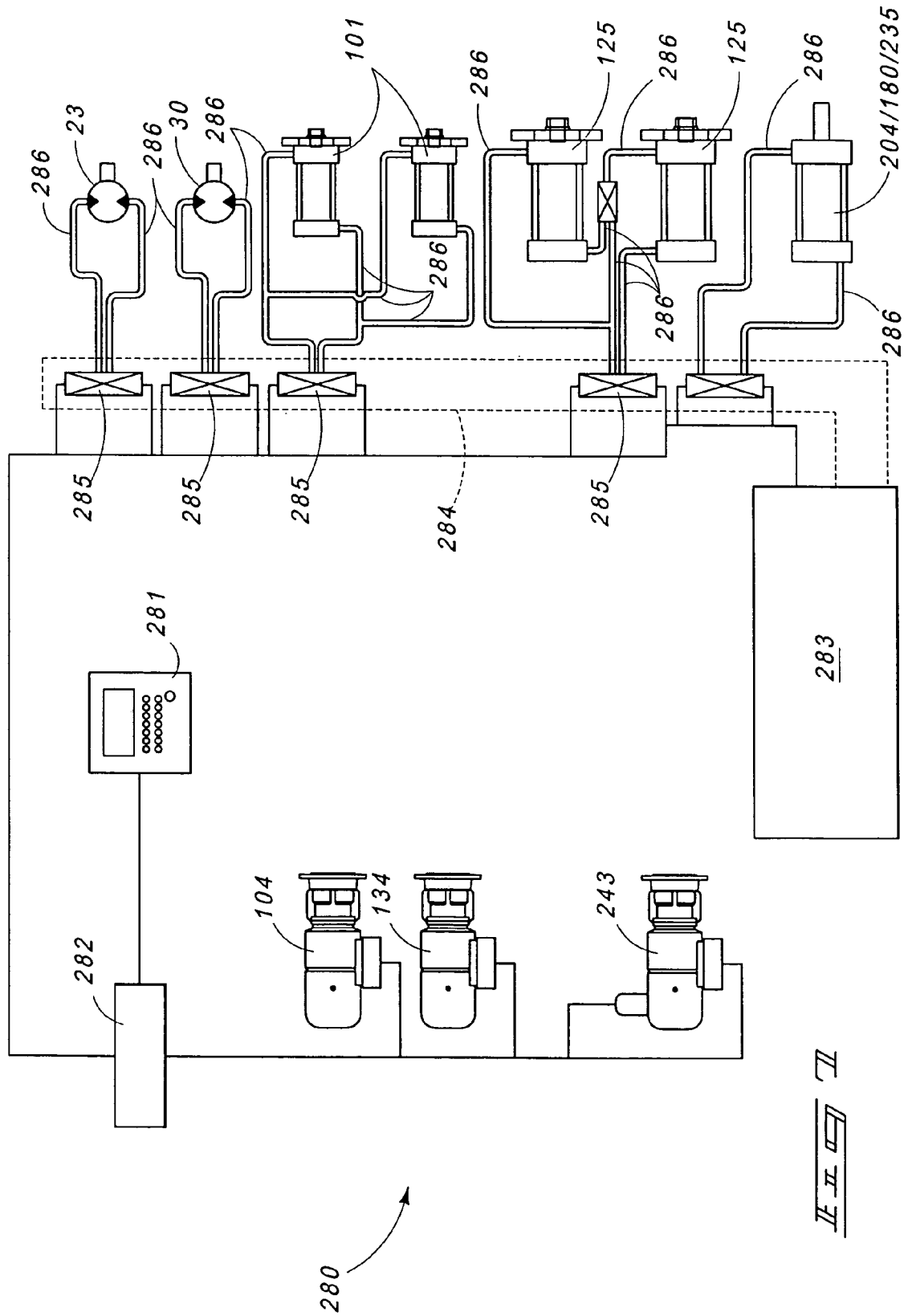

WEB FORMING MACHINE

RELATED PATENT DATA

This application claims priority from U.S. patent application Ser. No. 10/798,103, filed Mar. 10, 2004 now abandoned, entitled "Web Forming Machine."

TECHNICAL FIELD

The present invention relates to a web forming machine, and more specifically to an apparatus having cooperating first and second rotatable assemblies, and wherein one of the rotatable assemblies is reciprocally movable relative to the other. The invention finds usefulness for rapid, continuous, punching, forming or shearing of web like material such as sheet metal, and the like.

BACKGROUND OF THE INVENTION

The prior art is replete with numerous examples of sheet metal cutting and forming devices which have been fabricated for various purposes including specific operations such as cutting, perforating, embossing, crimping, and forming to name but a few. As a general matter, conventional sheet metal cutting and forming devices are typically fabricated utilizing numerous reciprocating presses. In this regard, material to be worked is placed within a press; positioned in a stationary location over a die; and thereafter the press, which is usually mechanically operated, is closed thereby forcing a second die into contact with the material being worked. Upon completion of the perforation or other forming step, the press is opened and the material being worked or other work piece is removed and a new work piece is later inserted; or the material being worked is indexed to a new position such that the process can be repeated.

Various solutions have been suggested for increasing the speed of operation of such devices. For example, in U.S. Pat. No. 4,732,028 the teachings of which are incorporated herein, one prior art solution included the use of a so-called flying shear or die which is used with a strip which is moving continuously. In this system, the die is accelerated to the speed of the strip, and the press closes while the die and strip are moving in unison. The die then opens and returns to its starting position. Typically the punching, forming and shearing of continuous material utilizing a device such as this is limited to a line speed of about 250 feet per minute.

The prior art further discloses various rotary machines which are useful in shearing or forming web-like material. However, in the use of such devices it is well known that flat dies used in conventional reciprocating presses do not operate in such devices. Still further, considerable problems are encountered in the use of curved dies. In this regard, many prior art references teach and acknowledge that curved dies, while they will work on various materials, will often cause deformation and distortion of a work piece.

In addition to the foregoing difficulties, many products that are fabricated from web-like material such as sheet metal, and the like, often require that different sized apertures be formed in various locations in the web in order to form a resulting work piece. Examples of such work pieces such as metal structural members, are illustrated in FIGS. 1A, 1B and 1C, respectively. As will be appreciated from studying those Figures, the positioning of appropriate dies in the correct locations and the proper distances presents difficulties in the manufacturing process. Typically, the machines which are useful for this purpose are very long in length, and the resulting control systems necessary to control the speed as well as the positioning of the web material relative to the various rotary presses needed for such end products presents assorted difficulties.

Therefore, a new and improved web forming machine which addresses these and other shortcomings attendant with the prior art practices and apparatuses utilized heretofore is the subject matter of the present invention.

SUMMARY OF THE INVENTION

One aspect of the present invention relates to a web forming machine which includes a first rotatable assembly; a second rotatable assembly positioned in spaced relation relative to the first rotatable assembly, and wherein a gap is defined between the first rotatable assembly, and the second rotatable assembly, and wherein a web of material to be formed is received in the gap; and means for reciprocally moving the first rotatable assembly into contact with the web, and into mating relation relative to the second rotatable assembly.

Still another aspect of the present invention relates to a web forming machine and which includes a work station; a selectively rotatable and moveable punch assembly positioned above, and in spaced relation relative to, the work station; a selectively rotatable die assembly positioned below the work station and which is operable to matingly cooperate with the punch assembly; a web of material selectively positioned in the work station, and wherein the punch assembly is moveable along a path of travel and into penetrating contact with the web and into mating relation relative to the rotatable die assembly; a computer memory which stores at least one pattern of apertures which are to be formed in the web; and a controller electrically coupled with the computer memory, and further controllably coupled with each of the rotatable punch and die assemblies, and further controllably positioning the web in the work station, and wherein the controller selectively causes the rotational movement of the rotatable punch and die assemblies and the selective positioning of the web, and further causes the rotatable punch assembly to move along the path of travel and into penetrating contact with the web to form the at least one pattern of apertures which are stored in the memory.

A further aspect of the present invention relates to a method of forming a web which includes providing a web of material having a top and bottom surface; defining a work station and selectively positioning the web of material in the work station; providing a selectively moveable and rotatable punch assembly and positioning the moveable and rotatable punch assembly in spaced relation relative to the top surface of the web; providing a selectively rotatable die assembly and positioning the selectively rotatable die assembly in an adjacent position relative to the bottom surface of the web; and forming at least one aperture in the web of material by moving the rotatable punch assembly into penetrating contact with the top surface of the web and into mating engagement with the rotatable die assembly.

These and other aspects of the present invention will be discussed in greater detail hereinafter.

BRIEF DESCRIPTION OF THE DRAWINGS

Preferred embodiments of the invention are described below with reference to the following accompanying drawings.

FIGS. 1A, 1B, and 1C, are plan views of portions of web material having various apertures or other elevated structures formed thereon.

FIG. 2A is a side elevation view of a portion of a web forming machine in accordance with the teachings of the present invention.

FIG. 2B is a side elevation view of yet another portion of the web forming machine and which is positioned downstream from that portion of the web forming machine shown in FIG. 2A.

FIG. 2B1 is a fragmentary, transverse, enlarged vertical sectional view taken through a portion of the structure shown in FIG. 2B as indicated by the arrow in the drawing.

FIG. 2B2 is a fragmentary, transverse, enlarged vertical sectional view of a portion of the web forming machine as shown in FIG. 2B.

FIG. 2C is a fragmentary, side elevation view of a portion of the web forming machine of the present invention, and which is positioned downstream of that portion of the same machine as shown in FIG. 2B.

FIG. 3 is a fragmentary, transverse, vertical sectional view of a portion of the web forming machine as shown in FIG. 2.

FIG. 4 is a fragmentary, transverse, vertical sectional view of a portion of the web forming machine and which is taken from a position along line 4-4 in FIG. 3.

FIG. 6 is a fragmentary, transverse, vertical sectional view taken through the first and second rotatable assemblies of the present invention and which are shown in a second position.

FIG. 7 is a greatly simplified schematic diagram showing features of the control system utilized with the present invention.

DETAILED DESCRIPTION OF THE PREFERRED EMBODIMENTS

Figure 5:
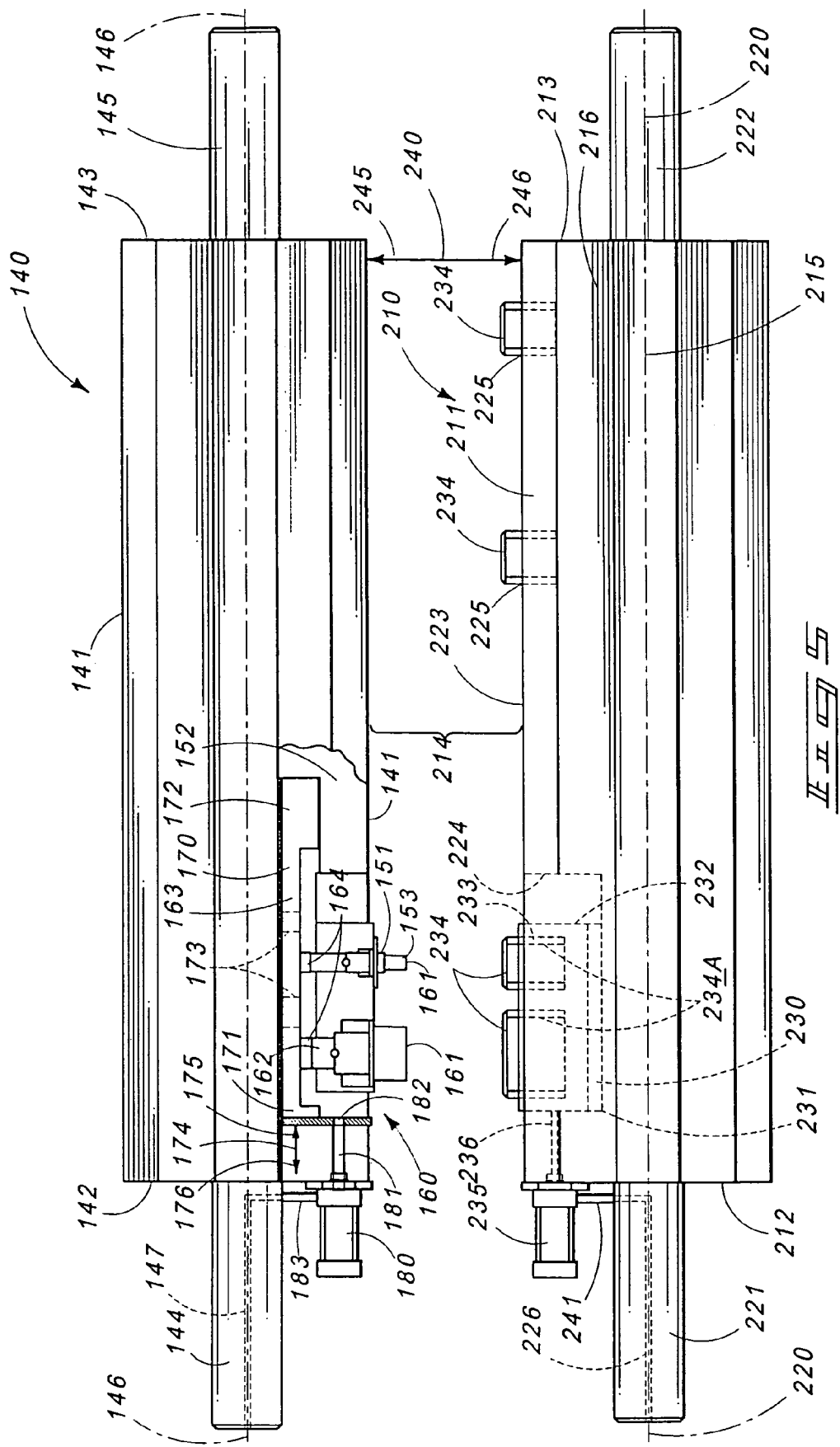
FIG. 5 is a fragmentary, transverse, vertical sectional view taken through the first and second rotatable assemblies of the present invention.

This disclosure of the invention is submitted in furtherance of the constitutional purposes of the U.S. Patent Laws "to promote the progress of science and useful arts" (Article 1, Section 8).

The web forming machine or apparatus of the present invention is generally indicated by the numeral 10 in FIG. 2, and following. Referring now more specifically to FIGS. 2A, 2B, 2B1, 2B2 and 2C, a web forming machine of the present invention 10 is shown, and which is positioned or otherwise mounted on a factory floor which is generally indicated by the numeral 11. As seen in FIG. 2A, a pit 12 is formed in the factory floor thereby defining a region through which a continuous web of material, which will be described below, passes through, as it is being treated by the web forming machine 10. The web forming machine or apparatus of the present invention includes a first portion generally indicated by the numeral 13 and which is shown in FIG. 2A, a second portion 14 as best seen by reference to FIG. 2B, and a third portion 15 as best seen by reference to FIG. 2C.

Referring now to FIG. 2A which shows the first portion 13 of the apparatus, it will be seen that the web forming machine 10 of the present invention includes a source of continuous web material here illustrated in phantom lines as a coil of web material which is generally indicated by the numeral 20. The coil of web material 20 is mounted for rotational movement on a supporting frame which is generally indicated by the numeral 21. The supporting frame 21 is affixed onto the floor or other supporting surface 11. The supporting frame 21 has an apex 22 which supports the continuous coil of web material 20 in spaced relationship relative to the floor 11. A motor 23 is affixed on the apex 22, and is operable to selectively rotate the continuous coil of web material 20. An advancing sheet of the continuous coil of web material 24 is shown, and is received within, and acted upon by a device which is generally indicated by the numeral 30, and which is utilized to selectively advance the sheet of web material, and simultaneously flatten the advancing sheet so that it may be processed by other assemblies of the web forming machine 10. This coil advancing device for advancing the web of material 24 is known in the art, and is positioned downstream relative to the source of the continuous web material 20. The coil advancing device 30 is operable to supply the advancing sheet 24 to a feed table which is generally indicated by the numeral 31. The feed table has a base 32 which is fixed on the floor or other supporting surface 11, and further has a moveable tabletop which is generally indicated by the numeral 33. As seen in FIG. 2A, the tabletop is moveable from a position 33A as seen in solid lines in FIG. 2A, where it supports the advancing web of material 24; to a second position 33B, shown in phantom lines, whereby the fluid powered cylinders 34 move the tabletop 33 to a non-supporting position such that a loop of web material 35 is received in the pit 12. This loop of web material 35 allows the web forming machine 10 to have a ready supply of web material 20 for the web forming process which will be discussed in greater detail hereinafter.

The web forming machine of the present invention 10 is operable to form various work products as seen in FIGS. 1A, 1B and 1C, for example. For purposes of the present application, the source of the continuous web material 20 will hereinafter be referred to as a coil of sheet metal. This sheet metal is useful in forming, for example, metal structural members as might be useful in building construction. However, it will be recognized that the coil of continuous web material 20 could contain other materials such as paper, various synthetic plastics, cloth and other natural and man-made materials. The work products which are generally indicated by the numeral 40 in FIGS. 1A, 1B and 1C include a first pattern of apertures and raised or elevated areas generally indicated by the numeral 41; a second pattern as indicated by the numeral 42; and a third pattern as indicated by the numeral 43. Each of the work products 40 which are formed of portions of the advancing web 24, have a first end 44, and an opposite second end 45. Still further, each portion has a top surface 50 and a bottom surface 51. As seen in FIG. 1A, the first pattern of apertures or raised or elevated areas 41 include a plurality of round apertures 52 which are positioned near the opposite ends and other locations which are at a predetermined spaced distance from one of the peripheral edges. As should be appreciated, these work products 40, as illustrated in FIGS. 1A, 1B and 1C, may be further bent or otherwise folded in various ways to form various utilitarian shapes. It will be recognized therefore that the apertures, for example, may, following this bending or other deforming, actually be positioned on resulting flange-like assemblies such as might be the case where the individual work products 40 are folded in order to form C-shaped or Z-shaped structure members or studs as might be useful in construction. As seen in FIG. 1B, a second pattern of apertures 42, and raised or elevated areas are shown. In this particular view, it will be seen that the second pattern may include round apertures 52 as well as oval or channel-shaped apertures 53. Still further, elevated or raised areas 54 may be formed in the surface of the work product 40 for various purposes. Referring now to FIG. 1C, a third possible work product formed by the present web forming machine 10 may include both round apertures 52, oval or channel shaped apertures 53 as well as other raised or elevated areas 54, all of which are disposed in given patterns along the top surface of the work product 40. As should be understood, the apertures, or channels referenced above, extend between the top and bottom surface 50 and 51 thereof in order to provide a continuous passageway.

Referring now to FIG. 2B which shows the second portion 14 of the web forming machine 10, it will be seen that the second portion 14 includes a plurality of work stations generally indicated by the numeral 70. These work stations are further identified as a first work station 71; a second work station 72; and a third work station 73. As should be appreciated, the first work station 71 is positioned downstream relative to the feed table 31 as seen in FIG. 2A. It will be further recognized that the loop of web material 35 in the pit 12 is further fed continuously into the first work station 71 as will be described in further detail below. The second portion 14 of the web forming machine 10 includes a base frame generally indicated by the numeral 74, and which is mounted in a fixed location on the floor or other supporting surface 11. The base frame 74 has a top surface 75, and opposite first and second ends 76 and 77, respectively. As seen in FIG. 2B a servo-pinch/roller assembly 80 of conventional design is mounted on the top surface 75, and is positioned near the first end 76 of the base frame 74. The servo-pinch/roller 80 includes a frame 81 which is mounted on the top surface 75. The frame 81 includes a first roller 82 which is positioned in a fixed location relative to the frame 81 and which is coupled in force receiving relation relative to a motor 83. The motor 83 imparts rotational movement to the first roller 82. Further, a second roller 84 is moveably borne by the frame 81. The second roller 84 is reciprocally moveable relative to the first roller 82 by means of a fluid powered cylinder 85 which is mounted on the frame 81. A gap 86 is defined between the first and second rollers 82 and 84, and the continuous web of material 24 is received therebetween. In operation, the first and second rollers 82 and 84 are moved into forcible engagement one with the other thereby pinching the web of material 24 therebetween. Rotational movement of the first roller 82 by means of energizing the motor 83 causes the web of material 24 to be selectively advanced through the second and third work stations 72 and 73 as will be discussed in greater detail hereinafter.

As seen in the longitudinal, substantially vertical sectional view of FIG. 2B, which is taken through the second portion 14 of the web forming machine 10, a pair of guide rollers 90 are provided, and which are operable to receive and orient, or otherwise guide, the continuous web of material 24 through the first, second and third work stations 71, 72 and 73. As should be appreciated, while one pair of guide rollers 90 are shown in FIG. 2B, there would be an opposite pair of guide rollers (not shown) positioned on the opposite side of the machine 10. The individual guide rollers are operable to engage the peripheral edge of the continuous web of material 24 thereby orienting and guiding it substantially along the top surface 75 of the base frame 74. The second work station 72, further includes a selectively moveable platen which is generally indicated by the numeral 91. The moveable platen has a top surface 92, and further has formed therein a plurality of channels or passageways 93 which extend through the moveable platen. As should be understood, a plurality of dies 94 are individually mounted on the top surface 92 and are substantially coaxially aligned relative to the respective channels or passageways 93. The individual dies 94, each have a passageway 95 formed therein. A platen movement assembly 96 is shown, in phantom lines, and which is coupled in force transmitting relation relative to the moveable platen 91. The platen movement assembly 95 is operable to selectively position the moveable platen in various locations so as to appropriately position the respective dies so that they are substantially coaxially aligned with a punch assembly which will be discussed below. The platen is moveable in X and Y directions in a plane which is substantial parallel to the top surface 75. The control and operation of the platen movement assembly will be discussed in greater detail with respect to FIG. 7 in the paragraphs below.

The second work station 72 further includes a frame 100 which is mounted on the top surface 75 of the base frame 74. The frame 100 mounts a fluid powered ram assembly 101 on the top surface thereof. The fluid powered ram assembly includes a ram portion 102 which is reciprocally moveable along a path of travel for the purposes which will be described below. The second work station 72 further includes a rotatable punch assembly which is generally indicated by the numeral 103. The rotatable punch assembly is selectively rotated by means of an indexing motor 104 (as seen in FIG. 7) into given orientations in order to position individual punches 105 which are positioned thereabout the rotatable punch assembly 103 into appropriate positions so that they may be individually moved substantially along a linear path of travel 110 and into deforming or penetrating contact relative to the substantially continuous web 24, and into mating engagement with the underlying substantially coaxially aligned dies 94 which are mounted on the top surface 92 of the moveable platen 91. As should be understood, the ram portion 102 is disposed in force transmitting engagement relative to the rotatable punch assembly 103. Therefore, the first rotatable punch assembly is not only rotatable as indicated by the arrows, but is further selectively, reciprocally moveable along a path of travel 110 from a first position 111, where the individual punches 105 engage the continuous web 24 to deform or otherwise form apertures 52 and 53 as seen in FIGS. 1A, 1B and 1C, respectively, and then further is moveable by the same ram portion 102 into a disengaged position 112, thereby permitting the continuous web of material 24 to be moved onto the third work station 73. As will be appreciated, while four punches 105 are shown in FIG. 2B it will be appreciated that, depending upon the diametral dimensions of the rotatable punch assembly, more than four punches 105 may be mounted thereabout the first rotatable punch assembly. Still further, the plurality of punches 105 may be of different sizes and shapes in order to form the round apertures 52, ovals or channel shaped apertures 53, or the raised or elevated areas 54 in the work products 40 which are formed by the web forming machine 10.

Referring still to FIGS. 2B, 3 and 4, the web forming machine 10 of the present invention includes a third work station 73, which is positioned downstream from the second work station 72. In this regard, the third work station 73 includes a frame which is generally indicated by the numeral 120. The frame includes a pair of spaced apart frame members 121 which are best seen in FIG. 3. The frame members have a first, or top surface 122, and a second or bottom surface 123, which is affixed on the supporting surface or floor 11. As best seen in FIGS. 3 and 4, a fluid powered ram assembly 125 is mounted on the first or top surface 122, and includes a reciprocally moveable ram portion 126 as seen in phantom lines in FIG. 3. The ram portion 126 has a distal end 130. Each of the respective frame members 121 defines a longitudinally extending channel 131. As seen in FIG. 3, a first bearing block 132 is slideably received within one of the channels 131 of one of the frame members 121, and a second bearing block 133 is received in the other of the two frame members 121. As illustrated in FIG. 3, the distal end 130 of the ram portion 126 is affixed to these respective bearing blocks, and is operable to reciprocally move the respective bearing blocks within each of the channels 131. Referring still to FIG. 3, a motor 134 having a motor shaft 135 is mounted on the first bearing block 132. The motor, when selectively energized, is operable to impart rotational movement to the motor shaft for the purposes which will be described in the paragraphs which follow. As will be appreciated, the respective fluid powered rams 126 are operable to move the respective bearing blocks along a substantially vertically disposed path of travel.

A first selectively rotatable and reciprocally moveable punch assembly 140 is mounted in the third work station 73, and on the respective pair of frame members 121, as discussed above. The first rotatable punch assembly 140 has a cylindrically shaped main body 141 which has a first end 142, and an opposite second end 143. As should be understood, the main body may assume other shapes. As seen in FIGS. 3, 5 and 6, for example, the first rotatable punch assembly includes an axle which is composed of a first axle portion 144, which extends substantially axially, normally, outwardly relative to the first end 142, and a second portion 145 which extends substantially axially, normally, outwardly relative to the second end 143. The first and second axle portions are substantially coaxially aligned and define an axis of rotation 146 for the moveable punch assembly 140. Still further, a fluid passageway 147 is formed in the first axle portion 144, and is operable to deliver a fluid under pressure, for the purposes which will be described in greater detail hereinafter. As seen in FIGS. 5 and 6, for example, the first rotatable punch assembly has an exterior facing surface 150 which has a plurality of apertures or receiving stations 151 formed therein. Still further, a channel 152 is formed in the main body 141 and communicates with the exterior surface 150 as illustrated in FIGS. 3, 5 and 6. The first rotatable punch assembly mounts a plurality of differently sized and shaped punches 153 for forming the different apertures 52 and 53 in the continuous web material 24. These different apertures, of various shapes, and raised areas 54 are seen most clearly in FIGS. 1A, B and C, respectively. Still further, at least one deforming tool 154 is mounted on the exterior surface 150 and is operable to form the various raised or elevated surface areas such as seen at numeral 54 in FIG. 1B. Additionally, a first portion of a severing tool 155 is borne by the first rotatable punch assembly and is operable under certain conditions to shear or sever the web of material 25 as will be discussed hereinafter and as more clearly seen in FIG. 4.

Referring now to FIG. 5, it will be seen that the first rotatable punch assembly 140 includes a punch orientation assembly which is generally indicated by the numeral 160. The punch orientation assembly 160, which is borne by the rotatable punch assembly 140, is operable in a first mode of operation, as will be described below, to position at least one punch 153 in a first position; and in a second mode of operation, permits the at least one punch 153 to move from a first radially extended position to a recessed, second position. More specifically, the punch orientation assembly 160 as seen in FIG. 5 is operable to position at least one punch 153 having a first end 161, and a second end 162, in a given, substantially radially extending orientation relative to the exterior surface 150 of the main body 141. In this regard, the punch orientation assembly includes a punch orientation frame 163 which slideably positions the individual punches 153 in the first position or axially extending orientation relative to the exterior surface 150. As seen in FIG. 5, the punch orientation frame includes individual passageways 164 which slideably or telescopingly receive the respective punches 153. Still further, the punch orientation assembly includes a slideably positionable orientation bar 170 within the channel 152 and which mechanically cooperates with the punch orientation frame. The orientation bar 170 has a first end 171, and an opposite second end 172. Still further, individual passageways 173 are formed therein. The orientation bar 170 is operable to move along a course of travel 174, between a first position 175, which defines a first mode of operation for the punch orientation assembly 160; and a second position 176 which defines a second mode of operation.

As illustrated in FIG. 5, the first rotatable punch assembly 140 mounts on the first end 142, a fluid powered actuator which is generally indicated by the numeral 180. The fluid powered actuator has a moveable ram 181 having a distal end 182 which is mounted in force transmitting relation relative to the first end 171 of the orientation bar 170. Still further, the fluid powered actuator 180 includes a fluid coupler 183 which is connected in fluid flowing relation relative to the fluid passageway 147 and which extends through the first axle portion 144. As should be understood, the selective supplying of fluid under pressure to the fluid powered actuator 180 causes the moveable ram 181 to move the orientation bar 170 along the course of travel 174 between the first and second positions 175 and 176. While this fluid powered actuator is depicted in FIG. 5 and FIG. 7 as hydraulically activated, it will be recognized that this same assembly may comprise a pneumatically activated cylinder. As discussed above, in the first position 175, which defines the first mode of operation, and as seen in FIG. 5, the orientation bar is positioned such that the individual punches 153 extend substantially radially, normally, outwardly relative to the exterior surface 150. In this position, the individual punches 153 are oriented such that when they are moved into contact with the continuous web 24, they penetrate same in order to form the various apertures 52 and other features in the web 24. Still further, and in the second position 176, which defines the second mode of operation, the orientation bar is positioned so as to orient the individual passageways 173 in substantially coaxial alignment relative to the passageways 164 which are formed in the punch orientation frame 163. When these respective passageways are substantially coaxially aligned, the individual punches 153 are able to move along the passageway 164 such that the first end 161 of the punches 153 are positioned in a substantially co-planer relationship relative to the exterior surface 150. When the first rotatable punch assembly 140 is moved into contact with the continuous web 24 as will be discussed below, these individual punches 153, do not penetrate the web 24. This, of course prevents an aperture 52 or 53 from being formed therein. It will be appreciated, therefore, that this arrangement provides a convenient means whereby an operator can selectively form various aperture patterns and arrangements depending upon the design of the final end product.

A punch movement assembly is generally indicated by the numeral 190 in FIG. 6. The punch movement assembly is moveably borne by the rotatable punch assembly 140, and is operable to move at least one punch 153 along a course of travel which is substantially parallel to the axis of rotation 146 of the rotatable punch assembly to change the relative position of the punch with respect to the exterior facing surface 150. In this regard, the punch movement assembly 190 is operable to move at least one punch 153 which has a first end 191, and a second end 192, along a course of travel which will be described below. The punch movement assembly includes a moveable punch frame 193 which is received in the channel 152 which is defined by the main body 141. The moveable punch frame has a main body 194 which has a first end 195, and an opposite second end 196. Still further, at least one channel, passageway, or bore 200 may be formed in the main body 194, and is operable to matingly receive the second end 192 of a punch 153. As seen in FIG. 6, the moveable frame 193 can be selectively positioned along a course of travel 201 which is substantially parallel to the axis of rotation 146. The course of travel 201 is defined between a first position 202 and a second position 203. A fluid powered actuator 204 is borne by the first end 142 of the first rotatable punch assembly 140. The fluid powered actuator includes a moveable ram 205 which is mounted in force transmitting relation relative to the first end 195 of the moveable punch frame 193. Still further, a fluid coupler 206 is coupled in fluid flowing relation relative to the fluid powered actuator 204. The fluid coupler 206 is coupled in fluid flowing relation relative to the fluid passageway 147. As should be understood, the selective application of fluid pressure to the fluid passageway 147 has the effect of moving the ram 205, and thus the moveable punch frame 193 along the course of travel 201 to change the relative position of the respective punches 153 to the exterior facing surface 150.

Referring now to FIGS. 3, 5 and 6, the third work station 73 includes a selectively rotatable die movement assembly which is generally indicated by the numeral 210. The selectively rotatable die movement assembly 210 has a cylindrically shaped main body 211 which has opposite first and second ends 212 and 213, respectively. The main body 211 may also assume other shapes. As seen in FIGS. 3 and 5, for example, a gap 214 is defined between the selectively rotatable die movement assembly 210 and the first rotatable punch assembly 140. As will be appreciated from a study of FIG. 2B the substantially continuous web 24 is received in the gap 214 and thereafter is formed into a work product 40 as seen in FIGS. 1A, 1B and 1C by the action of the rotatable punch assembly 140 acting upon the selectively rotatable die assembly 210. The selectively rotatable die assembly 210 rotates about an axle 215 which defines an axis of rotation which is generally indicated by the line labeled 220. This axis of rotation is generally parallel to the axis of rotation 146 of the rotatable punch assembly (see FIG. 6). These respective axes of rotation are not coaxially aligned but rather are in spaced relation one relative to the other. The axle 215 has a first axle portion 221 which extends substantially axially, normally, outwardly relative to the first end 212, and a second axle portion 222 which correspondingly extends substantially axially, normally, outwardly relative to the second end 213. Still further, the main body 211 is defined by an exterior facing surface 223 that has formed therein a channel which is generally indicated by the numeral 224. Still further, various apertures 225 are formed in the exterior facing surface. Moreover, a fluid passageway 226 is formed in the first axel portion 221.

As seen in FIGS. 5 and 6, a moveable die block 230 is received in the channel 224. The moveable die block has a first end 231, and an opposite second end 232. Still further, at least one channel or bore 233 is formed in the moveable die block and is operable to matingly receive a die which is generally indicated by the numeral 234. The dies 234 are of conventional design and have a passageway 234A extending therethrough. As seen in FIG. 5, a fluid powered actuator of conventional design 235 is mounted on the first end 212 of the main body 211. The fluid powered actuator includes a moveable ram 236 which is mounted in force transmitting relation relative to the first end 231 of the moveable die block 230. The selective application of fluid pressure to the fluid powered actuator 235 causes the die block 230 to move along a course of travel 240, which is generally parallel to the exterior facing surface 223 of the main body 211. The fluid powered actuator 235 further includes a fluid coupler 241 which is coupled in fluid flowing relation relative to the fluid passageway 226 which is formed in the first axle portion 221. Those skilled in the art will recognize that this fluid powered actuator may also comprise a pneumatically actuated cylinder.

As will be appreciated from a study of FIG. 6, the die block 230 is operable to be positioned in a location such that the individual dies 234 are substantially coaxially aligned relative to the punches 153 which are mounted on the first rotatable punch assembly 140. As earlier discussed with respect to the punch movement assembly 190, the moveable die block 230, as seen in FIG. 6 permits an operator, by means of a control system, which will be described hereinafter, to conveniently position both the punches 153, and the corresponding mating dies 234 in various locations relative to the exterior facing surfaces of the respective assemblies 140 and 210 so that apertures 52 and 53 may be variously located in the continuous web 24 which passes through the gap 214. As best seen by reference to FIG. 3, a selectively actuatable motor 243 is mounted on one of the frame members 121 of frame 120, and is substantially coaxially aligned relative to the second bearing block 133. The motor 243 may be selectively energized to cause the second rotatable die assembly to index to an appropriate position so that it may be substantially coaxially aligned relative to the mating punches 153 which are mounted on the rotatable punch assembly 140. As seen most clearly by references to FIGS. 4, 5 and 6, the first rotatable punch assembly is reciprocally moveable along a substantially vertically disposed and linear path of travel 244 between a spaced first position 245 which allows the passage of the web 24 through the gap 214 to a second position 246 where the first rotatable punch assembly is moved into forceable mating engagement with the selectively rotatable yet now stationary die assembly to, on the one hand form apertures 52 and 53 in the continuous web 24, or to otherwise deform the web, or to sever the continuous web as illustrated in FIG. 4 by the use of the severing tool 155. The second portion of the severing tool is seen at numeral 246 in FIG. 4 and extends substantially radially outwardly relative to the exterior surface 223. The portion of the web 24 which is punched out to form the aperture 52 passes through the respective dies 225 and into an internal passageway 247 where it then exits endwardly from the assembly 210.

Referring now to FIG. 2C it should be understood that a sheet/web conveyor 250 is positioned downstream of the third work station 73 as described above. As should be appreciated, once the substantially continuous web 24 has passed through the third work station 73 the sheet/web conveyor 250 is operable to move the continuous web to a fourth work station which will be described below. The sheet/web conveyor 250 is of conventional design having supporting legs 251 which are mounted in a fixed position on the floor or other supporting surface 11. The supporting legs position a conveyor bed 252 in spaced relation relative to the floor. A motor 253 is mounted on the conveyor bed and is operable to propel the conveyor bed, and the continuous web resting thereon in the direction of arrows as seen in FIG. 2C to the fourth work station 260. The fourth work station 260 includes a supporting frame 261, having a top surface 262, and a bottom surface 263 which rests in a fixed location on the supporting surface 11. Still further, positioned along the top surface 262 is a plurality of spaced, roll formers 264 of convention design. As many as 14 or more roll formers may be positioned in spaced locations along the top surface, only 2 are shown in the drawings, and the others are indicated by the dotted lines in that view. These roll formers are operable to further act upon the continuous web of material 24 to bend or otherwise shape the continuous web into a resulting work piece 40 that may have a substantially C, Z or other shape. The web forming machine 10 has a discharge end generally indicated by the numeral 265 where the resulting work product is removed.

Referring now to FIG. 7, a simplified schematic depiction of a portion of a control system 280 which is useful in the practice of the present invention is shown. This schematic view shows the control system as it operably couples with various assemblies made integral with the invention 10 such as motors and various fluid powered actuators, and not the entire assembly 10 in order to assist in an understanding of the invention. In this regard, the control system 280 includes a computer which is generally indicated by the numeral 281 and which has a memory which stores at least one pattern of apertures as seen in FIGS. 1A, B and C to be formed in the continuous web of material 24. The computer 281, having the memory, is electrically coupled with a programmable logic controller 282. The programmable logic controller 282 is further operably controllably coupled to the rotatable punch and die assemblies 140 and 210, respectively as seen in FIGS. 3, 4 and 5, as well as the motor 23 and the coil advancing device 30. Still further, the controller 282 is operably controllably coupled to the punch orientation assembly 160, and punch movement assembly 190 as seen in FIGS. 5 and 6, as well as to the fluid powered actuator 235 which positions the moveable die block 230 along the course of travel 240. As seen in FIG. 7, a high fluid pressure control unit of conventional design 283 is provided, and which is operable to provide a reservoir of high pressure fluid which may be supplied by means of a plurality of fluid delivery and return conduits which are generally indicated by the dotted lines labeled 284 to the plurality of fluid powered actuators which have been discussed above, in the present application. Still further, each of the fluid powered actuators are coupled to an electrically actuated valve and sensor arrangement which is generally indicated by the numeral 285. This electrically actuated valve and sensor arrangement is coupled both in fluid flowing relation relative to the high fluid pressure control unit 283 and electrically to the controller 282. Still further, fluid conduits 286 are provided for each of the fluid powered actuators, motors or the like, and which are operable for the delivery and return of high pressure fluid which is sent to the respective fluid powered actuators in order to render the web forming machine 10 operable. As will be appreciated by a study of FIG. 7, the programmable logic controller 281, in response to the memory included within the computer 281, indexes or appropriately rotates the respective rotatable punch and die assemblies 140 and 210 by means of the motors 104 and 134, such that they are in appropriate orientations one relative to the other, and further selectively positions the continuous web of material 24 in the respective work stations 72, 73 and 260. After this step of indexing, and with the respective assemblies 140 and 210 no longer rotating, the control system 280 by means of the programmable logic controller 282 is operable to move the punch assembly 140 into penetrating contact, for example, with the top surface of the continuous web of material 24 and into mating relation or cooperation relative to the underlying die assembly 210. Other assemblies may be further controlled by the programmable logic controller in order to assist in the appropriate movement of the continuous web of material 24 through the respective work stations. The indexing of the respective assemblies 140 and 210 may be repeated a number of times in order to form a plurality of apertures 52 and 53 before the continuous web is advanced to the next downstream work station. This invention therefore provides a convenient means by which complex patterns of apertures may be formed in a work piece 40 without the need of a multiplicity of presses. Therefore, the footprint of the present invention on a factory floor 11 is much smaller than the prior art assemblies utilized heretofore.

Operation

The operation of the described embodiment of present invention is believed to be readily apparent and is briefly summarized at this point.

A web forming machine of the present invention is shown in FIG. 1 and following and includes a first rotatable assembly 140. A second rotatable assembly 210 is positioned in spaced relation relative to the first rotatable assembly, and wherein a gap 214 is defined between the first rotatable assembly 140, and the second rotatable assembly 210. A web of material 24 to be formed is received in the gap 214. Still further, the web forming machine 10 includes a means for reciprocally moving the first rotatable assembly 125 into contact with the web 24, and into mating relation relative to the second rotatable assembly 210. In the embodiment of the invention as shown, this first rotatable assembly comprises a rotatable punch assembly 140, and the second rotatable assembly comprises a rotatable die assembly 210. The web forming machine 10 further includes a first selectively actuatable motor 134 which is disposed in force transmitting relation relative to the rotatable punch assembly 140 and which causes the rotatable punch assembly to rotate to a predetermined orientation relative to the rotatable die assembly 210. Further, a second selectively actuatable motor 243 is disposed in force transmitting relation relative to the rotatable die assembly 210 and which causes the rotatable die assembly 210 to rotate to a predetermined orientation relative to the rotatable punch assembly. Still further, a controller 282 is controllably coupled to the first and second selectively actuatable motors 134 and 243, and the means for reciprocally moving the rotatable punch assembly 125 into penetrating contact with the web, and into subsequent mating relation with the rotatable die assembly 210. In the apparatus 10 as shown, the controller 282 first causes the rotatable punch and die assemblies to each be positioned in appropriate predetermined orientations, and then secondly, causes the rotatable punch assembly 140 to reciprocally move into penetrating contact relative to the continuous web 24. As discussed in the paragraphs above, the rotatable punch assembly 140 has a plurality of punches 153 which are positioned at various locations about the exterior surface 150 thereof, and the rotatable die assembly 210 has a plurality of dies 234 positioned at various locations about the exterior surface 223 thereof.

In operation, the individual punches 153 are operable to mate with the individual dies 234. To effect this, the controller 282 selectively actuates the respective first and second motors 134 and 243 to rotate the rotatable punch assembly 140 and rotatable die assembly 210 so as to substantially coaxially align mating punches 153 and dies 234. In the arrangement as shown, the movement of the first rotatable punch assembly into contact with the second rotatable die assembly 210 is along a linear path of travel 240 (FIG. 5) once the respective assemblies have stopped rotating. The movement of the first rotatable assembly 140 relative to the second rotatable assembly 210 causes the penetration, severing or permanent deformation of the continuous web of material 24 which is positioned in the gap 214. A punch movement assembly 190 is provided and seen in FIG. 6, and which is operable to move punches 153 along a substantially parallel path of travel 201 relative to the exterior facing surface 150 of the rotatable punch assembly 140. Still further, the selectively rotatable die assembly 210 includes a moveable die block 230 which is operable to move individual dies 234 along a substantially parallel path of travel 240 relative to the exterior facing surface 223 thereof, such that it may be substantially aligned with the moveable punches 153 positioned thereabove. In this manner, the apparatus 10 allows for design flexibility with respect to the formation of various apertures 52 and 53 at various locations in the continuous web as seen in FIGS. 1A, 1B and 1C, respectively. A drive assembly 204 and 235 (FIG. 6) is provided for each of the punch movement and die movement assemblies in order to selectively position the respective punches 153 and dies 234 along individual courses of travel. Yet further, the present apparatus 10 further includes a punch orientation assembly 160 (FIG. 5) and which is operable, in a first mode of operation, to position at least one punch 153 in a first position, whereby it extends substantially radially, normally, outwardly relative to the exterior facing surface thereof, and in a second mode of operation permits the at least one punch 153 to move from the first to a second position, and wherein the punch(s) are received internally of the rotatable punch assembly 140 such that an aperture 52 or 53 is not formed when the rotatable punch assembly 140 moves into contact with the rotatable die assembly 210.

Another aspect of the web forming machine 10 of the present invention includes at least one work station 72 or 73, and a selectively rotatable and moveable punch assembly 140 positioned above, and in spaced relation relative to, the work station 72. Still further, the web forming machine 10 includes a selectively rotatable die assembly 210 positioned below the work station 73 and which is operable to matingly cooperate with the punch assembly 140. Still further, a web of material 24 is selectively positioned in the work station 73. The selectively rotatable punch assembly 140 is moveable along a path of travel 240 and into penetrating contact with the web 24 and into mating relation relative to the rotatable die assembly 210. A computer memory 281 stores at least one pattern of apertures 52 and 53, and which are to be formed in the web 24, and as seen in FIGS. 1A, 1B and 1C, respectively. Still further, a controller 282 is controllably coupled with each of the rotatable punch and die assemblies 140 and 210, and further controllably positions the web 24 in the work station 73. The controller selectively causes the rotational movement of the rotatable punch and die assemblies, and the selective positioning of the web. Still further, the controller causes the rotatable punch assembly 140 to move along the path of travel 240 and into penetrating contact with the web to form the at least one pattern of apertures which are stored in the memory. As earlier discussed, the selectively rotatable punch and die assemblies 140 and 210 do not rotate when the rotatable punch assembly moves along the path of travel 240 and into penetrating contact with the web 24.

The present invention further includes a method of forming a web 24 into a work product 40, and which includes a step of providing a web of material 24 having top and bottom surfaces; and further defining a work station 73, and selectively positioning the web of material 24 in the work station. Still further, the method includes the step of providing a selectively moveable and rotatable punch assembly 140, and positioning the moveable and rotatable punch assembly in spaced relation relative to the top surface of the web. The method also further includes the step of providing a selectively rotatable die assembly 210 and positioning the selectively rotatable die assembly in an adjacent position relative to the bottom surface of the web. The method includes the step of forming at least one aperture 52 or 53 in the web of material 24 by moving the rotatable punch assembly into penetrating contact with the top surface of the web and into mating engagement with the underlying rotatable die assembly. After the step of providing the rotatable die assembly 210, and before the step of moving the rotatable punch assembly into penetrating contact with the web of material 24, the method includes the step of indexing the respective rotatable punch and die assemblies 140 and 210 relative to the top and bottom surfaces 50 and 51 of the web material 24. The method of the present invention further includes the step of providing a computer memory stored in a computer 281 and which stores at least one pattern of apertures to be formed in the web 24, and providing a controller 282 which is electrically coupled to the memory and which is further operably coupled to the rotatable punch and die assemblies 140 and 210, respectively. In the present method, the controller 282 indexes the respective rotatable punch and die assemblies 140 and 210, and then further selectively positions the web of material 24 in the work station 73. After the step of indexing, the controller is operable to move the rotatable punch assembly 140 into penetrating contact with the top surface of the web and into mating relation relative to the rotatable die assembly 210.

Therefore it will be seen that the present invention provides a convenient means of forming products 40 from a continuous web 24 in a fashion not possible heretofore. Still further, the apparatus of the present invention 10 is compact and has a reduced factory footprint in relative comparison to the prior art devices and other assemblies utilized to form products of this type. Still further, the present apparatus provides a convenient means whereby patterns of apertures can be stored in a computer memory and thereafter formed in a continuous web of material in a fashion not possible heretofore.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A web forming machine comprising:
   a work station frame having a pair of spaced apart vertically oriented frame members each having a top surface, and further each defining a vertically oriented and longitudinally extending channel, and wherein a work station is defined between the spaced apart frame members;

a web of material positioned in the work station;

means for selectively positioning the web of material in the work station;

a fluid powered ram assembly mounted on the top surface of each of the frame members of the work station frame, and wherein the respective fluid powered ram assemblies each have a ram portion having a distal end and which extends into the respective longitudinally extending channels;

a pair of bearing blocks which are individually slideably received in each of the longitudinally extending channels defined by the respective spaced frame members, and wherein the distal end of each of the ram portions are affixed to the respective bearing blocks, and wherein a simultaneous, reciprocal movement of the respective ram portions causes a corresponding reciprocal substantially simultaneous vertical movement of each of the bearing blocks along the respective longitudinally extending channels;

a first motor having a rotatable motor shaft mounted on one of the bearing blocks and which is moveable therewith when the bearing blocks are moved along the longitudinally extending channels by the movement of the distal end of each of the ram portions;

an independently and selectively rotatable punch assembly having a generally cylindrically shaped main body with opposite first and second ends; an exterior facing surface which defines a plurality of apertures; an interior channel defined by the main body; and first and second axle members which extend coaxially outwardly relative to the opposite first and second ends of the main body, and wherein the respective first and second axle members are rotatably secured in the individual bearing blocks and are moveable therewith, and wherein the first axle member is engaged by the motor shaft of the first motor, and wherein the first motor, when energized imparts substantially horizontal rotational movement to the generally cylindrically shaped main body, and the simultaneous reciprocal movement of the respective ram portions imparts substantially reciprocal vertical movement to the main body of the punch assembly, and wherein a fluid passageway is formed in the first axle member;

a source of fluid under pressure which is coupled in fluid flowing relation relative to the fluid powered ram assemblies which are mounted on the work station frame and the fluid passageway formed in the first axle member of the selectively rotatable punch assembly;

a punch orientation assembly received within the internal channel of the rotatable punch assembly, and which has a punch orientation frame which has individual passageways which slideably and telescopingly receive individual punches, and wherein a slideably positionable orientation bar having opposite first and second ends is received within the internal channel of the punch assembly, and which mechanically cooperates with the punch orientation frame, and wherein the orientation bar is moveable along course of travel from a first position, which causes at least one punch to extend through at least one of the apertures defined by the exterior facing surface of the main body and be positioned in a first radially extended position relative thereto, and further to a second position which causes the at least one punch to move from the first radially extended position to a second recessed position where the punch is received substantially entirely within the internal channel as defined by the punch assembly;

a first fluid powered actuator having a moveable ram, and which is mounted on the first end of the main body of the rotatable punch assembly and is rotatable therewith, and wherein the first fluid powered actuator is coupled in fluid flowing relation relative to the fluid passageway which is defined by the first axle member, and wherein the moveable ram of the first fluid powered actuator extends into the internal channel of the rotatable punch assembly and is coupled in force transmitting relation relative to the first end of the orientation bar, and wherein the selective supplying of the fluid under pressure to the first fluid powered actuator causes the moveable ram of the first fluid powered actuator to move the orientation bar along the course of travel between the first and second positions;

a punch movement assembly received with the internal channel of the rotatable punch assembly and which moves at least one of the plurality of punches along a course of travel so as to change the location of the punch relative to the exterior facing surface of the rotatable punch assembly, and wherein the punch movement assembly has a moveable punch frame having opposite first and second ends and which is received within the internal channel, and wherein at least one punch is mounted on the punch frame and extends through one of the apertures defined by the exterior facing surface of the rotatable punch assembly, and wherein the frame is moveable along a course of travel between a first position and a second position;

a second fluid powered actuator having a moveable ram, and which is mounted on the first end of the main body of the rotatable punch assembly, and wherein the second fluid powered actuator is coupled in fluid flowing relation relative to the fluid passageway which is defined by the first axle member, and wherein the moveable ram of the second fluid powered actuator extends into the internal channel of the punch assembly, and is coupled in force transmitting relation relative to the first end of the moveable punch frame, and wherein the selective supplying of the fluid under pressure to the second fluid powered actuator causes the moveable ram of the second fluid powered actuator to move the moveable punch frame along the course to travel to change the location of the punch which is mounted on the punch frame relative to the exterior facing surface of the rotatable punch assembly;

a second motor having a rotatable motor shaft and which is mounted on one of the pair of spaced apart frame members which define the work station frame;

a selectively and independently rotatable die movement assembly rotatably mounted on, and oriented between the spaced apart frame members which define the work station frame, and which cooperates with the independently and selectively rotatable punch assembly in the work station, and wherein the die movement assembly is positioned in substantially parallel spaced relation relative to the rotatable punch assembly, and the web of material is positioned between the rotatable punch assembly, and the rotatable die movement assembly, and wherein the rotatable die movement assembly has a main body which is generally cylindrically shaped, and which has opposite first and second ends; an exterior facing surface which defines a plurality of apertures; an internal passageway which extends between the opposite first and second ends of the main body; and first and second axle members which extend coaxially outwardly relative to the opposite first and second ends of the main body, and wherein the first and second axle members are rotatably mounted on the respective pair of spaced apart frame member defining the work station frame, and wherein a fluid passageway is formed in the first axle member, and is coupled in fluid flowing relation relative to the source of fluid under pressure, and wherein the first axle member is engaged by the motor shaft of the second motor, and wherein the second motor when energized imparts selective rotational movement relative to the rotatable die movement assembly;

a moveable die block borne by the rotatable die movement assembly and positioned within one of the apertures defined by the exterior facing surface, and wherein the moveable die block has opposite first and second ends, and further mounts at least one die which defines a passageway extending therethrough and which communicates with the internal passageway as defined by the main body of the rotatable die movement assembly;

a third fluid powered actuator having a moveable ram with a distal end, and which is mounted on the first end of the rotatable die movement assembly, and wherein the third fluid powered actuator is coupled in fluid flowing relation relative to the fluid passageway which is defined by the first axle member of the rotatable die movement assembly, and wherein the selective supplying of the fluid under pressure to the third fluid powered actuator causes the moveable ram of the third fluid powered actuator to move the die block along a course of travel which is generally parallel to the exterior facing surface of the main body of the rotatable die movement assembly; and a control system operably coupled with the web forming machine and which has a computer having a memory which stores at least one pattern of apertures to be formed in the continuous web of material, and wherein the memory is electrically coupled to a programmable logic controller, and wherein the programmable logic controller is controllably coupled in metering relation relative to the source of fluid which is selectively supplied under pressure to the respective fluid powered ram assemblies; first, second, and third fluid powered actuators; the means for selectively positioning the web of material in the work station; and the first and second motors, and wherein the programmable logic controller in response to the memory of the computer, independently and selectively rotates the respective rotatable punch assembly and the rotatable die movement assembly by means of the first and second motors such that they are in appropriate orientations one relative to the other, and further selectively positions the web of material in the work station, and wherein the control system further appropriately positions the individual punches by means of the punch orientation assembly and/or the punch movement assembly in an appropriate coaxial orientation relative to a die which is moved into an appropriate location by means of the moveable die block, and wherein the control system thereafter causes the fluid powered ram assemblies to carry the rotatable punch assembly carrying at least one punch into penetrating contact with the web, and into mating receipt within a die which has been coaxially oriented therewith, and wherein the penetration of the web by the punch which has been carried by the rotatable punch assembly produces a punched out portion of the web which passes through the passageway defined by the coaxially aligned die, and which is received in the internal passageway as defined by the rotatable die movement assembly, and wherein the punched out portion of the web travels along the internal passageway of the rotatable die movement assembly, and exits the main body of the rotatable die movement assembly at one end thereof.

2. A web forming machine as claimed in claim 1, and wherein the web of material comprises a continuous metal sheet, and wherein the web forming machine further comprises:

at least one roll forming machine positioned downstream relative to the work station and which acts upon the web of material which has passed through the work station to form the web Into an end product which has a C, Z or other shape.

3. A web forming machine comprising:

a work station frame defined by a spaced apart frame members and which defines a work station there between;

a web of material;

means for selectively positioning the web of material in the work station;

an independently and selectively rotatable punch assembly having a main body which is rotatably positioned between the spaced apart frame members and reciprocally moveable along a substantially vertical path of travel;

means for selectively moving the independently and selectively rotatable punch assembly along the substantially vertical path of travel;

means for selectively rotating the main body of the independently and selectively rotatable punch assembly, and wherein the rotating means is moveable therewith;

a plurality of punches borne by the main body of the selectively rotatable punch assembly, and wherein at least one punch is moveable relative to the main body;

means for moving at least one of the plurality of punches to change the relative location, or orientation of at least one of the plurality of punches relative to the main body of the independently and selectively rotatable punch assembly;

a selectively and independently rotatable die movement assembly having a main body which is rotatably positioned between the spaced apart frame members defining the work station frame, and which further cooperates with the independently and selectively rotatable punch assembly, and wherein the web of material is placed therebetween the respective selectively and independently rotatable punch and die movement assemblies, and wherein the main body defines an internal passageway;

means for selectively rotating the main body of the independently and selectively rotatable die movement assembly;

a plurality of dies borne by the main body of the independently and selectively rotatable die movement assembly, and wherein at least one of the dies is moveable relative to the main body, and further defines a passageway which extends therethrough, and which communicates with the internal passageway of the selectively and independently rotatable die movement assembly;

means for moving at least one of the plurality of dies to change the relative location of the at least one of the plurality dies relative to the main body of the independently and selectively rotatable die movement assembly; and means for controlling the operation of the web forming machine and which is coupled in controlling relation relative to the means for selectively positioning the web of material in the work station; means for selectively rotating the independently and selectively rotatable punch and die movement assemblies; means for moving at least one of the punches and dies which are moveably mounted on the respective independently and selectively rotatable punch and die movement assemblies; and the means for moving the independently and selectively rotatable punch assembly along the substantially vertical path of travel so as to cause at least one of the plurality of punches to penetrate the web of material and be received within a coaxially aligned die which is borne on the independently and selectively rotatable die movement assembly.

4. A web forming machine as claimed in claim 3, and wherein the penetration of the punch through the web of material and into mating receipt with a coaxially aligned die causes a punched out portion of the web of material to be formed, and wherein the punched out portion of the web of material passes through the passageway defined by the die, and is received within the internal passageway defined by the independently and selectively rotatable die movement assembly.

5. A web forming machine as claimed in claim 3, and wherein the web of material comprises a continuous metal sheet, and wherein the web forming machine further comprises:

at least one roll forming machine positioned downstream of the workstation and which acts upon the web of material which has passed through the work station so as to form the web into an end product which has a predetermined shape.

\* \* \* \* \*